Patented Mar. 10, 1931

1,795,980

UNITED STATES PATENT OFFICE

ARNOLD S. WAHL, OF CHICAGO, ILLINOIS, ASSIGNOR TO E. W. STEWART & COMPANY, A CORPORATION OF ILLINOIS

ART OF BAKING

No Drawing.   Application filed February 15, 1930. Serial No. 428,826.

The present invention relates to improvements in the art of baking, and will be fully understood from the following description thereof, in which specific embodiments are set forth for purposes of illustration.

I have found that a substantial improvement is effected in the characteristics of baked products by incorporating therein suitable proportions of pectin, either in commercially dry form or in the form of a solution. The improvement is most marked in sweetened bakery goods, such as sweet rolls, coffee cake, cakes and the like and in its preferred form, the invention is employed in connection with such products. The employment of pectin in accordance with the present invention, as hereinafter set forth, results in a general improvement of the characteristics of baked products, and particularly of their texture, lightness and increased volume and yield.

The pectin may be included in the mix for the production of baked products in dry form, particularly in the case of unsweetened baked products. In the preferred method of carrying out the invention, in the production of sweetened products, it is preferably incorporated in solution and in such case it is found desirable, although not essential, to incorporate the sugar or other carbohydrate employed for sweetening, in the pectin solution. Thus, the sugar required in the mix may be incorporated into the pectin solution, preferably with a small amount of acid (which may be the acid constituent of the baking powder) to form a slightly viscous solution, which may be designated as a thin, flowing jelly. That is, the solution is prepared in the same manner as a jelly, but with sufficient additional water to permit of moderately free-flowing characteristics, varying from a thin, slightly viscous liquid to a fairly viscous liquid almost jelly-like in character, but not capable of setting to a solid, form-retaining mass. Similar results may be secured by using a reduced proportion of acid.

Such a thin or liquid gell of the water, pectin and sugar may be incorporated in the mix in any suitable manner. When eggs are present, and the egg-whites or whole eggs are beaten in the usual manner prior to incorporation into the mix, the pectin solution so prepared may be incorporated into the beaten egg substance. The mixture may then be incorporated into the remainder of the mix in the same manner as is customary with the beaten egg substance alone.

For example, a cake of the angel food type may be made in the following manner, unit quantities being given in order to simplify the recipe. Parts by weight are indicated.

The constituents employed are 64 parts of sugar; 64 parts of egg-white; 40 parts of flour; 36 parts of water; 2 parts of pectin (dry); one part of cream of tartar; together with flavor and salt.

Although the dry pectin may be mixed with the flour and other dry constituents and the eggs and water incorporated therein in the usual manner, it is preferred to prepare a thin viscous liquid or liquid jelly of the sugar, water, pectin and cream of tartar. The pectin is dissolved in the water, the solution brought to a boil, and the sugar and cream of tartar added thereto. This order of addition is not essential, since any other suitable method of solution involving but a brief boiling of the combined solution, as in jelly-making, may be employed. The eggs are beaten to a whip; the thin or liquid jelly formed of the solution of sugar, pectin and cream of tartar incorporated in the beaten egg whites and the mixture again beaten until stiff. The remaining dry constituents are then mixed into the batter in the manner in which they would ordinarily be admixed with the beaten egg whites. The batter is then placed in pans and baked in the usual manner. Other acid constituents than cream of tartar may be employed; for example, calcium acid phosphate, phosphoric or lactic acid, or the like.

The batter formed by carrying out the process in accordance with the present invention is somewhat stiffer, but lighter and has greater volume than when pectin is not employed. The lightness of the resulting cake is greater, as indicated by the larger volume of cake resulting from equal weights of batter containing the pectin in accordance with this invention. The cake acquires a greater gas retaining power by the use of the present invention, without toughening of its texture. The same is true of baked goods in which fermentation is employed as a leavening agent, as well as those using baking powder. The presence of egg white is not essential in mixtures embodying the present invention, since it may be employed in connection with eggless mixtures or mixtures in which whole eggs are used. In general, as hereinbefore stated, the pectin may be employed dry or in solution; when sugar is present however, it is preferred to embody the sugar, pectin and an acid constituent of the mix into a thin, viscous liquid or gell which is then incorporated with the remainder of the batch or mix.

Although the invention has been described in connection with the details of a specific embodiment thereof, it is not intended that these details shall be regarded as limitations upon the scope of the invention, except in so far as included in the accompanying claims.

I claim:

1. In the art of baking, the step in the preparation of a flour-containing mixture for baking which comprises incorporating pectin therein, the proportion thereof being about one-twentieth that of the flour.

2. In the art of baking, the step in the preparation of a flour-containing mixture for baking which comprises incorporating a solution of pectin therein, the pectin incorporated amounting to about one-twentieth the amount of flour.

3. In the art of baking sweetened goods, the step in the preparation of the mixture for baking which comprises preparing a solution of the sugar to be incorporated in the mixture, adding pectin to the solution, and incorporating the resultant solution in the mixture.

4. In the art of baking, the step of preparing the mixture for baking which comprises forming a thin, viscous solution of sugar and pectin, and incorporating the solution into the mixture.

5. In the art of baking sweetened goods containing egg substance, the steps comprising dissolving the pectin of the mixture in water, incorporating sugar therein to form a viscous liquid, beating the egg substance, incorporating the sugar and pectin liquid into the beaten egg substance and beating the mixture, and incorporating therein the remainder of the mix.

ARNOLD S. WAHL.